United States Patent
Majumdar et al.

(10) Patent No.: US 10,310,064 B2
(45) Date of Patent: Jun. 4, 2019

(54) SALIENCY BASED BEAM-FORMING FOR OBJECT DETECTION

(71) Applicant: QUALCOMM Incorporated, San Diego, CA (US)

(72) Inventors: Somdeb Majumdar, Mission Viejo, CA (US); Ernest Ozaki, Poway, CA (US); Richard Anthony Calle, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 15/236,748

(22) Filed: Aug. 15, 2016

(65) Prior Publication Data
US 2018/0045818 A1  Feb. 15, 2018

(51) Int. Cl.
| | | |
|---|---|---|
| *G01S 13/04* | (2006.01) | |
| *G01S 13/42* | (2006.01) | |
| *G01S 13/89* | (2006.01) | |
| *G01S 13/93* | (2006.01) | |
| *G01S 17/02* | (2006.01) | |
| *G01S 17/42* | (2006.01) | |
| *G01S 17/89* | (2006.01) | |
| *G01S 17/93* | (2006.01) | |
| *G01S 7/481* | (2006.01) | |

(52) U.S. Cl.
CPC ............ *G01S 13/04* (2013.01); *G01S 7/4817* (2013.01); *G01S 13/426* (2013.01); *G01S 13/89* (2013.01); *G01S 13/931* (2013.01); *G01S 17/026* (2013.01); *G01S 17/42* (2013.01); *G01S 17/89* (2013.01); *G01S 17/936* (2013.01)

(58) Field of Classification Search
CPC ........ G01S 7/282; G01S 13/04; G01S 13/426; G01S 13/89; G01S 13/90; G01S 13/9035; G01S 13/931
See application file for complete search history.

(56) References Cited

U.S. PATENT DOCUMENTS

| | | | | |
|---|---|---|---|---|
| 3,803,603 A | * | 4/1974 | Perot ..................... | G01S 7/2923 342/157 |
| 5,343,206 A | * | 8/1994 | Ansaldi ................. | G01S 13/931 342/179 |

(Continued)

OTHER PUBLICATIONS

International Search Report and Written Opinion—PCT/US2017/041994—ISA/EPO—dated Oct. 24, 2017.

*Primary Examiner* — Peter M Bythrow
(74) *Attorney, Agent, or Firm* — Arent Fox LLP

(57) ABSTRACT

A scanning device generally produces an image having a uniform resolution throughout a target region. To improve radar scanning/lidar scanning, an efficient scan approach to enable a radar device/lidar device to adoptively perform a scan of a target region based on interested regions and/or an adjustable resolution. The apparatus may be a scanning device for scanning. The apparatus performs a first scan over a target region to obtain a plurality of first scan samples at a plurality of locations within the target region. The apparatus generates a saliency map of the target region based on signal intensities of the plurality of first scan samples. The apparatus determines a salient region within the target region based on the saliency map. The apparatus performs at least one second scan over the salient region to obtain at least one second scan sample in the salient region.

40 Claims, 13 Drawing Sheets

(56) References Cited

U.S. PATENT DOCUMENTS

| | | | | |
|---|---|---|---|---|
| 6,018,307 | A * | 1/2000 | Wakayama | G01S 13/87 |
| | | | | 342/179 |
| 7,599,894 | B2 * | 10/2009 | Owechko | G06K 9/00369 |
| | | | | 382/104 |
| 8,812,226 | B2 * | 8/2014 | Zeng | G01S 13/723 |
| | | | | 382/103 |
| 9,261,590 | B1 * | 2/2016 | Brown | G01S 13/10 |
| 9,383,753 | B1 * | 7/2016 | Templeton | G05D 1/0246 |
| 9,555,803 | B2 * | 1/2017 | Pawlicki | B60W 30/18 |
| 2010/0292886 | A1 * | 11/2010 | Szczerba | G01C 21/365 |
| | | | | 701/31.4 |
| 2013/0206967 | A1 * | 8/2013 | Shpunt | G06T 15/00 |
| | | | | 250/216 |
| 2015/0117783 | A1 * | 4/2015 | Lin | G06K 9/4671 |
| | | | | 382/195 |
| 2015/0185079 | A1 * | 7/2015 | Justice | H01J 31/26 |
| | | | | 250/208.1 |
| 2016/0086050 | A1 * | 3/2016 | Piekniewski | G06T 7/90 |
| | | | | 382/103 |
| 2016/0146941 | A1 * | 5/2016 | Hassenpflug | G01S 17/42 |
| | | | | 356/4.01 |
| 2018/0113209 | A1 * | 4/2018 | Campbell | G01S 13/931 |

\* cited by examiner

SALIENCY BASED BEAM-FORMING FOR OBJECT DETECTION

BACKGROUND

Field

The present disclosure relates generally to object detection systems, and more particularly, to object detection by a scanning device for radio-based scanning or laser-based scanning.

Background

Object detection techniques have been developed for various applications including autonomous cars, drones and mobile robots. The object detection techniques may use different sensors and be employed in various devices based on object detection range and environmental conditions. For example, to enable a vehicle to detect an object in an area surrounding the vehicle, various sensors such as optical sensors, acoustic sensors, and laser-based sensors have been employed in vehicles. Object detection techniques using a radio-based scanning sensor such as a radar sensor or a laser-based scanning sensor such as a light detection and ranging (lidar) sensor have also been used. Lidar scanning generally provides a high resolution, but a distance over which an object can be reliably detected by lidar-based scanning may be short. Radar scanning of a scene or area may not be affected by environmental conditions such as weather as much as scanning approaches using other types of sensors. Further, a radar sensor scan may have a longer range than other types of sensors, and thus allow a scan over a longer distance. However, a radar sensor scan may be limited by processing power of an associated scanning device. The limited processing power may result in low scan resolution, longer scan processing time, etc. Therefore, a scanning approach using radar scanning and/or lidar scanning that provides efficient scanning and improved object detection is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A scanning device (e.g., a radar device or a lidar device) scans a target region to detect an object and generally produces data or an image having a uniform resolution throughout the target region for each scan. Hence, the scanning device generally lacks a feature to adjust a resolution in a certain portion within the target region and also lacks a feature to focus a scan in interested regions. Therefore, an efficient scan approach to enable a radar device/lidar device to adoptively perform a scan of a target region based on interested regions and/or an adjustable resolution.

In an aspect of the disclosure, a method, a computer-readable medium, and an apparatus are provided. The apparatus may be a scanning device for scanning. The apparatus performs a first scan over a target region to obtain a plurality of first scan samples at a plurality of locations within the target region. The apparatus generates a saliency map of the target region based on signal intensities of the plurality of first scan samples. The apparatus determines a salient region within the target region based on the saliency map. The apparatus performs at least one second scan over the salient region to obtain at least one second scan sample in the salient region.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
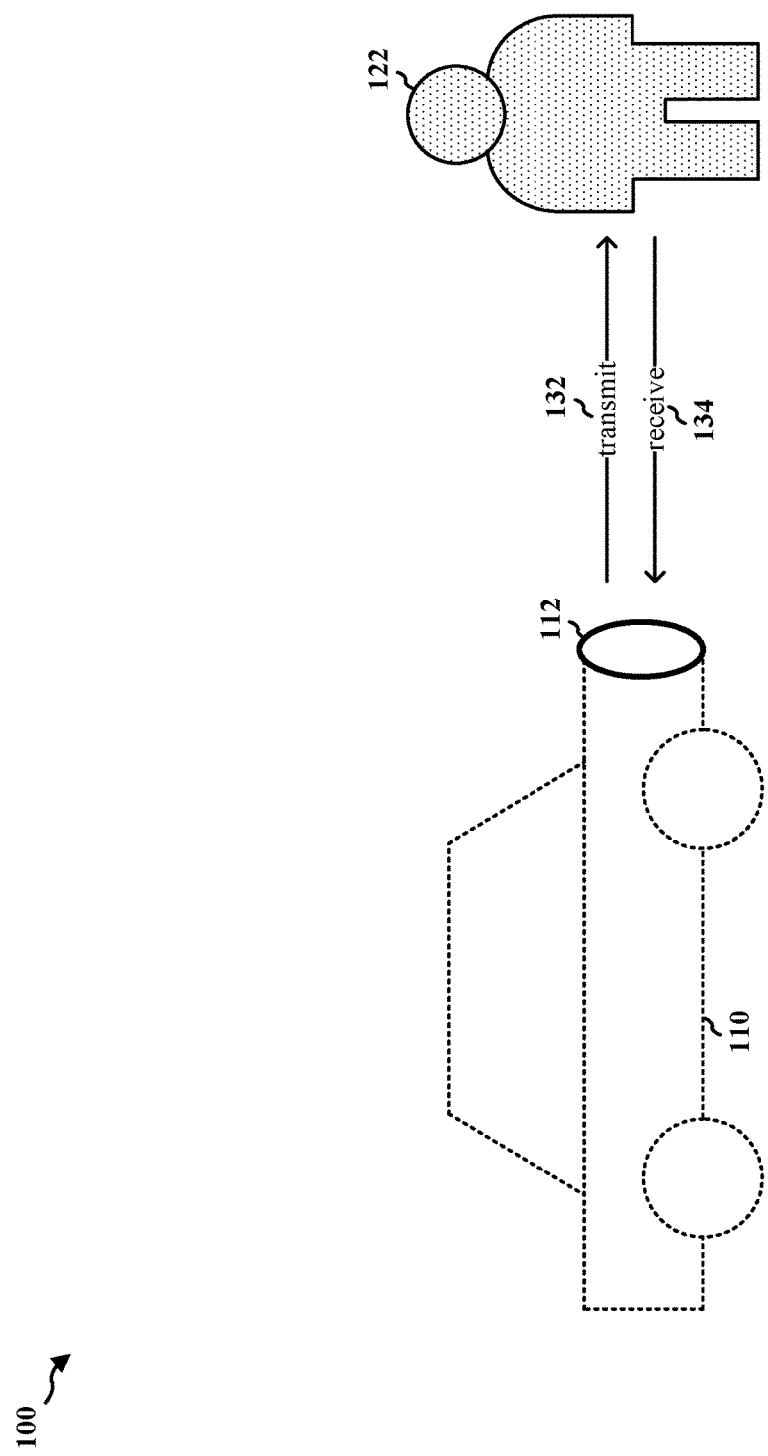
FIG. 1 is an example diagram illustrating an example use of a radar sensor/lidar sensor to detect an object.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various types of sensors have been developed to detect objects. For example, one or more types of sensors may be implemented in a vehicle to help the vehicle detect an object. Each type of sensor may have advantages and disadvantages. For example, advantages of optical sensors such as a camera or a lidar (light detection and ranging) device may include that the size of an optical sensor is small, the sensor resolution may be made high, and that algorithms for object recognition, motion detection, etc. have been developed. Disadvantages of optical sensors may include a limited distance over which an object may be detected (or sensed). For example, a focal length in a camera sensor and/or a return power for a lidar sensor may limit the distance (e.g., up to 100 meters) that the optical sensors can detect/distinguish objects.

Radar sensors may be used for object detection. An advantage of the radar sensor is that the radar sensor may be capable of reliably sensing (and detecting an object) at a longer distance than optical sensors. For example, a radar sensor device may be able to reliably detect an object that is more than 200 meters away from the radar sensor device. For example, detection of an object may be considered reliable when the object detected by the radar sensor device can be distinguished from a surrounding environment or another object. The long distance sensing of a radar sensor may be an important feature especially when employed in a vehicle that may move at a high rate of speed (e.g., at highway speeds). Warning of a possible collision should be provided to a driver of the vehicle to enable sufficient time for the driver to react, and thus the long distance sensing may provide the driver with the sufficient time to react. Another advantage of radar is that the radar may be capable of sensing objects in environmental conditions where optical sensors or other types of sensors have difficulty sensing an object due to the environmental conditions. For example, unlike optical sensors, radar sensors may detect objects in snow or rain or fog.

FIG. 1 is an example diagram 100 illustrating an example use of radar/lidar sensing to detect an object. The scanning device 112 may sense an object 122. In an aspect, the scanning device 112 may include a radar scanning device to sense the object 122 by sensing radio waves signals (or microwave signals) that are reflected from the object 122. In particular, the radar scanning device included in the scanning device 112 may transmit radio waves (or microwaves) at 132. When the radar radio waves reach the object 122, the radio waves are reflected by the object 122. Then the radar scanning device included in the scanning device 112 may receive at 134 the reflected radio waves to sense the object 122. In an aspect, the scanning device 112 may include a lidar scanning device to sense the object 122 by laser scanning. The scanning device 112 may be implemented in a vehicle 110 or may be implemented in a stationary structure, for example.

The radar may lack high angular resolution, due to a wide beam width. For example, a radar device may not be able to distinguish two separate objects that are less than 5° apart. The lack of angular resolution of the radar may prevent the radar from providing reliable sensing especially over a short distance. Beamforming may be employed to increase the angular resolution of the radar. Beamforming is a technique that may achieve high angular accuracy and increased resolution by using an array of multiple radar antenna elements. However, increasing the angular resolution may increase the size of the sensor array such that the size of the sensor array to achieve sub-1° resolution may be large. A radar device using existing beamforming techniques may scan a region in a uniform fashion, generally by sensing radar return signals at equally spaced locations over the region, without differentiating between an interesting zone in the region, e.g., a zone with a detected object, and other zones in the region. Thus, there is a need for low-cost, small form-factor radar sensors that have increased accuracy and increased resolution by taking advantage of the information in the radar returns, e.g., by using beamforming to focus the radar scan on interesting zones to speed up the radar scan and/or to increase the resolution on the interesting zones to distinguish objects that are close together and would appear as a single object when scanned at a lower resolution to cover the entire region. The similar beamforming technique may also be applied to a lidar device.

In a radar device or a lidar device, several non-directional antenna elements in a receiver antenna array may be used to scan a target region (e.g., in front of the receiver antenna array). The receiver antenna elements receive wave signals, and output the received wave signals. The output from each of the antenna elements may pass into a processor (e.g., digital signal processor (DSP)) via an analog-to-digital (A/D) converter. The DSP aggregates the output from each antenna element in a way that simulates a large single antenna, by effectively "steering" the receiver antenna array, using a beamforming approach. In particular, phase delays may be applied to the receiver antenna elements, such that when the phase-delayed signals from the receiver antenna elements are added together, the effect of digital steering of the receiver antenna array is achieved. Thus, the steering of the receiver antenna array is performed digitally by varying the phase values of the individual antenna elements. By varying the phase values of the individual receiver antenna elements, the radar device or the lidar device may digitally steer a main lobe of the receiver antenna array to a desired direction. The receiver antenna array has a maximum gain at a direction of the main lobe, and thus the direction of the main lobe is effectively a scanning direction. Alternatively, steering of the receiver antenna array may be performed by mechanically steering the receiver antenna array elements such that a main lobe of the receiver antenna array will be placed in a specific direction. By mechanically steering the receiver antenna array elements, the aggregated receiver antenna elements become physically biased to have the main lobe pointing in the specific direction. That is, the antenna gain has a maximum receive gain along the specific direction.

Figure 2:
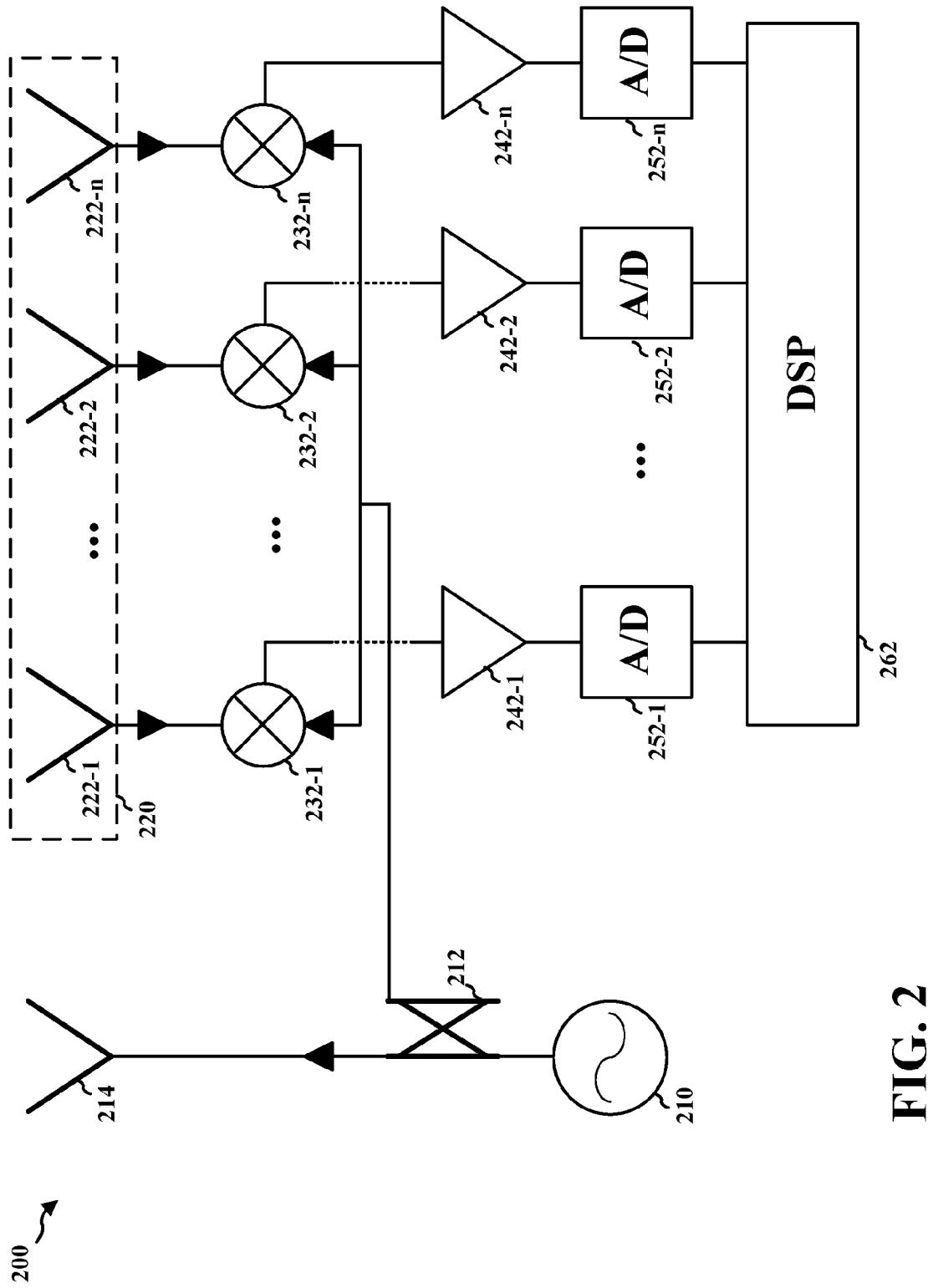
FIG. 2 is an example diagram of a digital beam-forming circuit for a radar device/lidar device.

FIG. 2 is an example diagram 200 of a digital beamforming circuit for a radar device/lidar device. The signal generator 210 generates a wave signal (e.g., radiofrequency signal), which is forwarded by a controller 212 to a wave transmitter 214. The transmitted signals may be reflected by an obstruction (e.g., an object, a structure, etc.). The receiver antenna array 220 includes antenna array elements 222-1, 222-2, ..., 222-n that are configured to receive the reflected signals. The controller 212 applies respective phase delays to the received signals at the weighting modules 232-1, 232-2, ..., 232-n. The weighted signals from the weighting modules 232-1, 232-2, ..., 232-n are amplified by the amplifiers 242-1, 242-2, ..., 242-n, and are passed through analog-digital converters 252-1, 252-2, ..., 252-n, respectively. The DSP 262 collects the resulting signals and processes the resulting signals to produce a composite scan.

Figure 3A:
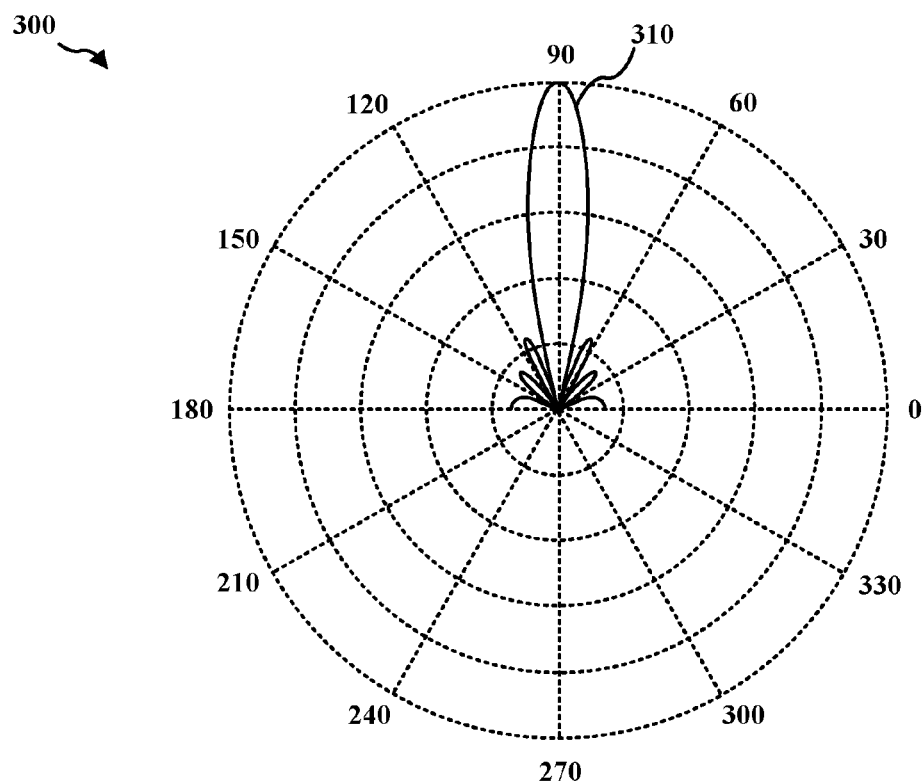
FIGS. 3A and 3B are example diagrams illustrating steering of a main lobe of a receiver antenna array.
Figure 3B:
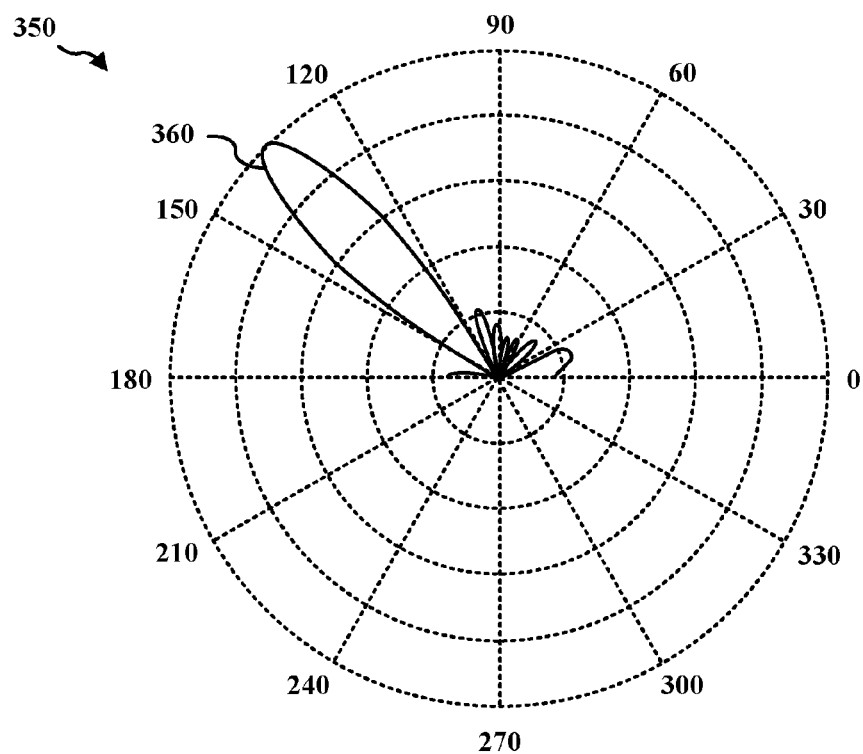

FIGS. 3A and 3B are diagrams illustrating steering of a main lobe of a receiver antenna array. For illustration purposes, in FIGS. 3A and 3B, the receiver antenna array physically faces a 90 degree angle. FIG. 3A is an example diagram 300 where no phase delay is applied to receiver antenna elements. Because no phase delay is applied, a main lobe 310 stays at a 90 degree angle, without being steered to another direction. Thus, in FIG. 3A, the receiver antenna array in FIG. 3A receives signals at the 90 degree angle, and thus has a maximum receive gain along the 90 degree angle. FIG. 3B is an example diagram 350 where phase delays are applied to receiver antenna elements. In the example of FIG. 3B, the phase delays are applied such that a main lobe 360 of the receiver antenna array is digitally steered to the left, at 135 degrees. Thus, in FIG. 3B, the receiver antenna array in FIG. 3G receives wave signals at the 135 degree angle, and thus has a maximum gain at the 135 degree angle.

Figure 4:
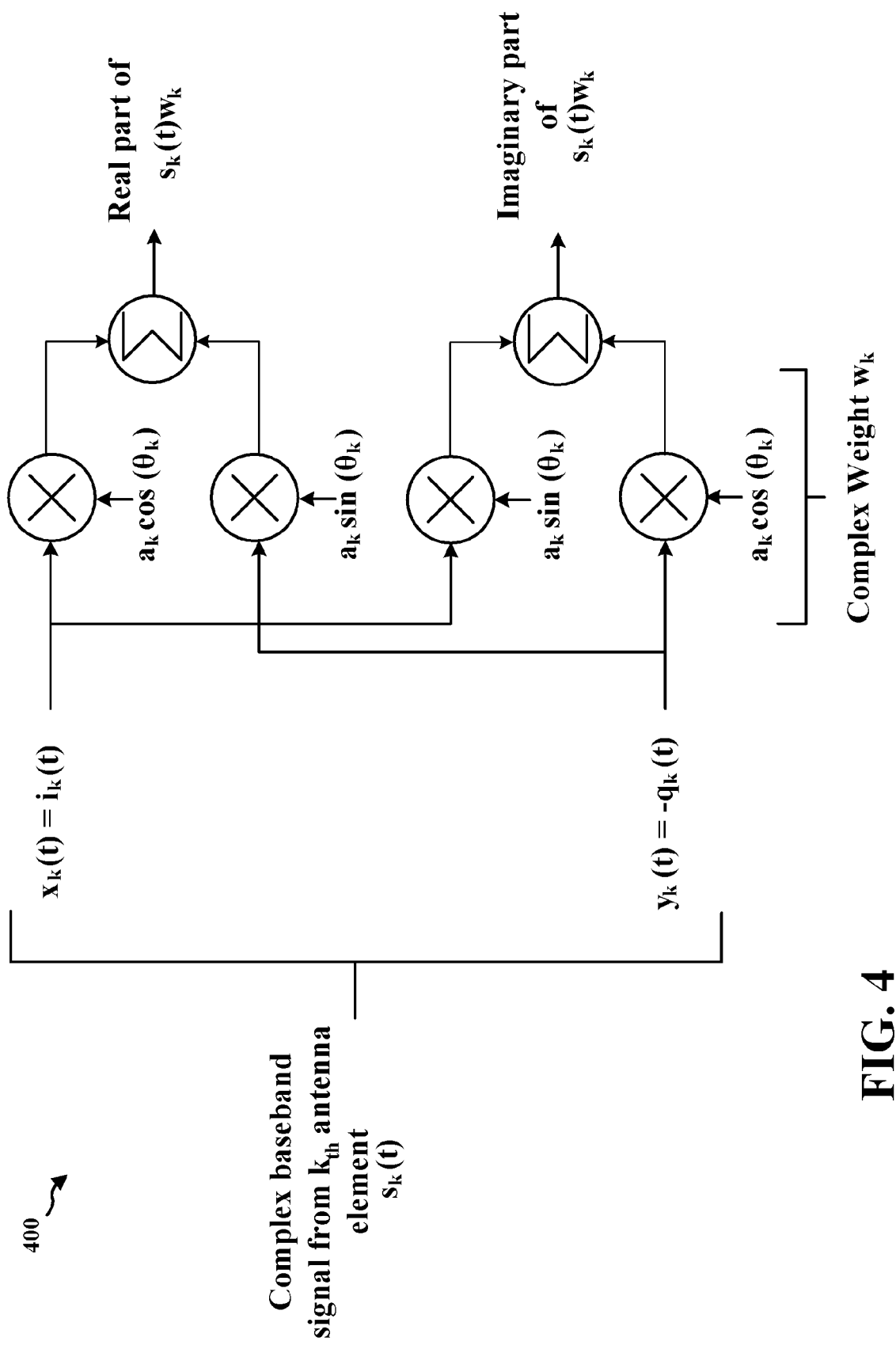
FIG. 4 is an example diagram illustrating a complex multiplier used to apply a complex weight component to a received wave signal.

A phase delay can be applied to a receiver antenna element by adding a complex weight that includes an amplitude component and a phase component. The phase component is used to add a delay, and the amplitude represents a gain. FIG. 4 is an example diagram 400 illustrating a complex multiplier used to apply a complex weight component to a received wave signal. For example, the controller 212 and the weighting modules 232-236 of FIG. 2 may have the complex multiplier features. The output from each receiver antenna element is multiplied by a complex weight component w that specifies how much to weigh the amplitude ($a_k$) and how much to rotate the phase ($\theta_k$). The complex weight can thus be expressed as $w_k = a_k e^{j \sin(\theta_k)}$. The weights may be applied on all of the elements to get an effective gain and an effective direction based on the weights. In the diagram 400 of FIG. 4, the complex baseband signal from $k^{th}$ receiver antenna element is split into an in-phase portion $i_k$ and a quadrature portion $q_k$, and the in-phase portion $i_k$ and the quadrature portion $q_k$ are weighted by the complex weight $w_k$, which results a real part of the weighted signal $s_k(t)w_k$ and an imaginary part of the weighted signal $s_k(t)w_k$. By adjusting the weights, the array may be pointed in a particular direction with a particular gain.

Figure 5:
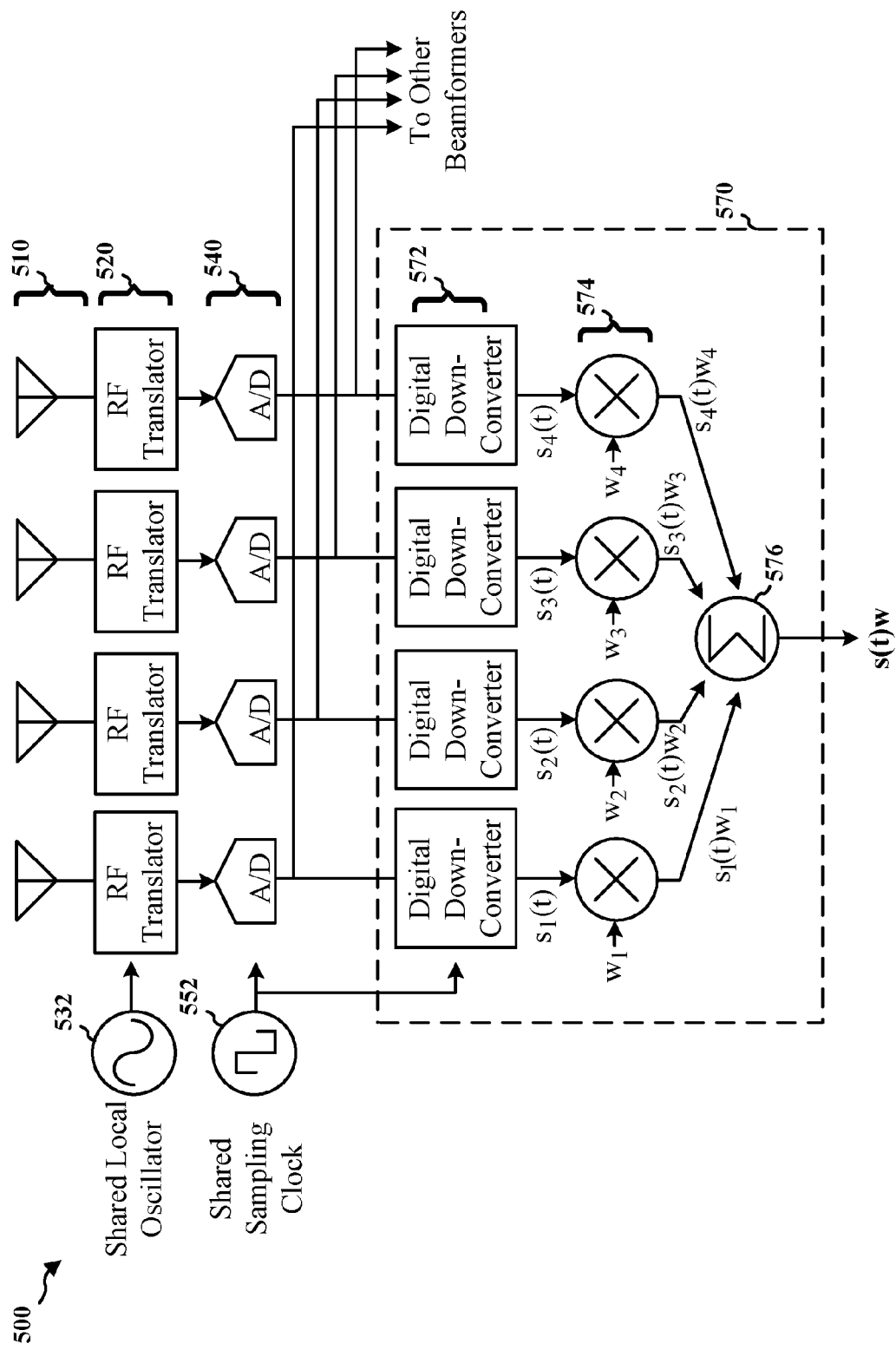
FIG. 5 is an example diagram illustrating a beamforming system for a receiver antenna array.

FIG. 5 is an example diagram 500 illustrating a beamforming system for a receiver antenna array. In the example diagram 500, a receiver antenna array 510 has four antenna elements, although more or fewer antenna elements may be used. The antenna elements of the receiver antenna array 510 receive signals and forward the signals to RF translators 520, respectively. A shared local oscillator may input a signal to each of the RF translators 520. The outputs of the RF translators 520 are input to respective A/D converters 540. A shared sampling clock 552 may input a square wave signal to each of the A/D converters 540 to convert the analog signal to a digital signal. The outputs of the A/D converters 540 are input to a DSP 570, and may be forwarded to other beamformers. The DSP 570 includes digital down-converters 572, weighting modules 574, and a summation module 576. In particular, the outputs of the A/D converters 540 are forwarded to the digital down-converters 572 that respectively produce baseband signals ($s_1(t)$, $s_2(t)$, $s_3(t)$, $s_4(t)$). The weighting modules 574 respectively bias the baseband signals ($s_1(t)$, $s_2(t)$, $s_3(t)$, $s_4(t)$), with respective weights ($w_1$, $w_2$, $w_3$, $w_4$). The resulting weighted signals ($s_1(t)w_1$, $s_2(t)w_2$, $s_3(t)w_3$, $s_4(t)w_4$) are aggregated by the summation module 576 to generate a beam-formed complex baseband signal s(t)w, which is output to a demodulator.

Radar devices/lidar devices (e.g., a radar device or a lidar device for automotive cases) may scan an environment by beamforming received signals from the receiver antenna array, thereby sampling for potential object detection in the paths of transmitted beams over several scan iterations. For each scan iteration, the radar device/lidar device steers the beam of the receiver antenna array in a particular direction such that completion of all scan iterations results in a single scan of the environment, where a single scan includes data from each direction the beam is steered. As discussed above, the received signals at the receiver antenna array may be reflected signals of a transmitted beam (e.g., radio frequency signal). When a radar device/lidar device performs a scan, the radar device/lidar device may steer the beam of the receiver antenna array (e.g., by beamforming) to equally-spaced locations on a target region over multiple scan iterations, where each scan iteration involves the receiver antenna array receiving a signal from a corresponding location on a target region. Thus, a radar device/lidar device may produce data or an image having a uniform resolution over the target region. For example, a radar device/lidar device may utilize all available receiver antenna elements to obtain the highest possible resolution for each scan iteration over a target region.

Figure 6:
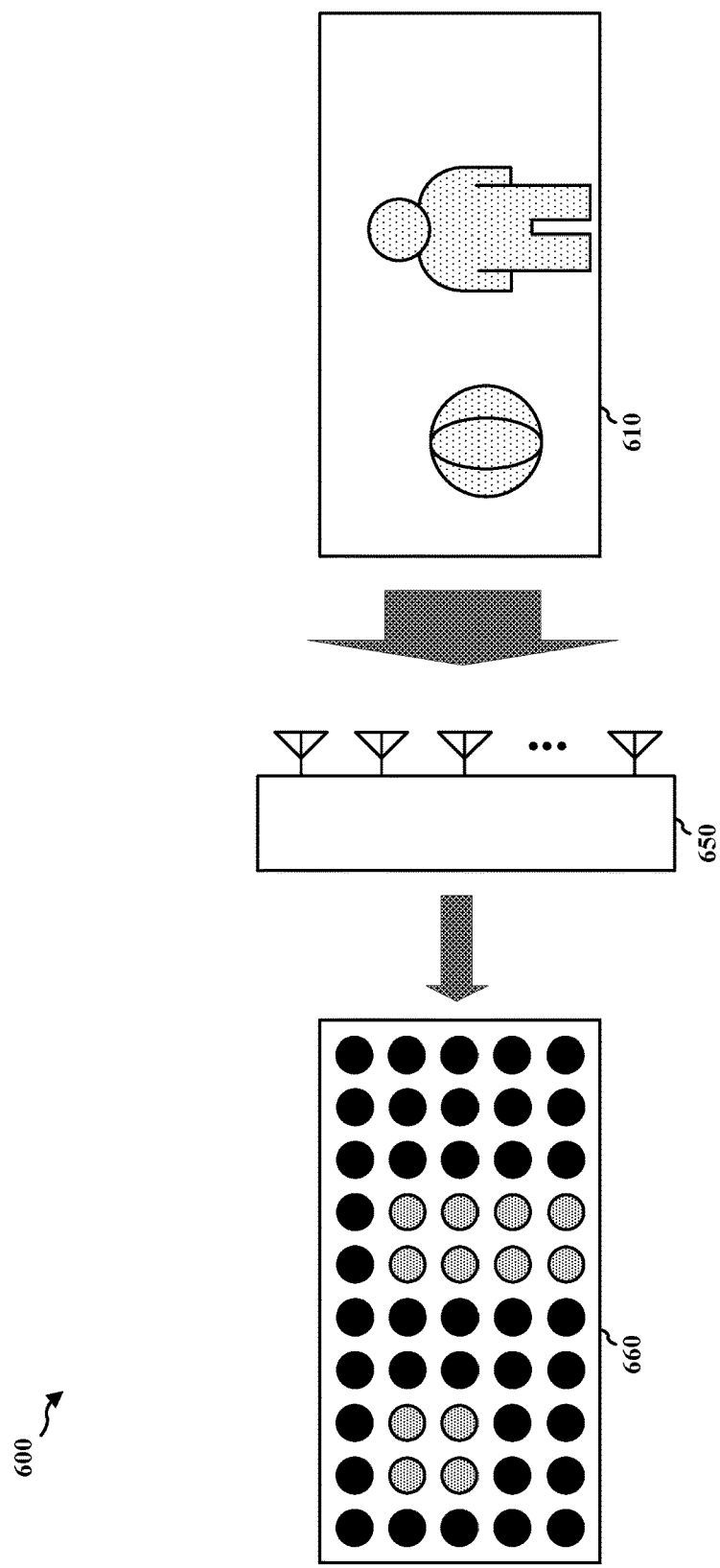
FIG. 6 is an example diagram illustrating a radar device/lidar device performing a scan of a region.

FIG. 6 is an example diagram 600 illustrating a radar device/lidar device performing a scan of a region. A scanning device 650 having a receiver antenna array with multiple antenna elements performs a scan of a target region 610, where the scanning device may include a radar device and/or a lidar device. The scanning device 650 performs the scan by receiving signals reflected from various portions of the target region 610. The scanning device 650 may steer the beam (e.g., by beamforming) to directions corresponding to these portions of the target region 610 to receive signals from these portions. In the example diagram 600, the scanning device 650 performs the scan by receiving signals at 50 (5×10) different portions in the target region 610, thus sampling at 50 scan iterations per scan. Each time the scanning device 650 steers the beam to a different direction, the scanning device 650 obtains signals (radar/lidar returns). In this example, the scanning device 650 steers the beam to 50 (5×10) different directions such that the scanning device 650 may receive signals (radar/lidar returns) from the 50 (5×10) different directions. The first scan result 660 shows 50 circles representing radar/lidar signal returns at 50 different scan angles (directions). The number of circles (scan iterations) per scan is generally limited by the processing power of the scanning device (e.g., processing power of the DSP) because each scan iteration consumes processing power. In the first scan result 660, black circles illustrate low intensity or no intensity and shaded circles illustrate high intensity indicating signal reflection from an object. The shaded circles correspond to the two objects (a ball and a person) in the target region 610. Because the signals are reflected from the two objects in the target region 610, the corresponding regions observe high intensity as illustrated by the shaded circles.

Because a radar device/lidar device may produce data or an image having a uniform resolution throughout a target region for each scan, the radar device/lidar device may lack a feature to adjust the resolution in a certain direction or in a certain location adaptively based on surrounding conditions (e.g., based on initial scan information). Further, a radar device/lidar device may utilize all available receiver antenna elements to scan each location to reduce the beamwidth of the main lobe for higher resolution. However, utilizing all available receiver antenna resources for all scan iterations may be time consuming and may consume processing power. Further, reallocation of the receiver antenna resources to achieve increased accuracy in zones of the region by adaptively adjusting the resolution and/or the number of scan iterations utilized in scanning may be desirable.

According to an aspect of the disclosure, a radar device/lidar device adaptively determines resource allocations regarding the receiver antenna elements based on one or more previous radar/lidar scans. The aspect may provide increased efficiency and/or increased accuracy of object tracking for a given number of receiver antenna elements (M), a scan frequency (F Hz), and a number of directions per scan (D). In particular, before making a decision to utilize a specific amount of antenna resources to perform a scan, a radar device/lidar device (e.g., a DSP of the radar device/lidar device) performs one or more initial scans to determine a statistical significance (e.g., probability) on whether an object is present at a particular angle or not. In an aspect, if the radar device/lidar device determines based on the initial scans that an object is present at the particular angle, the radar device/lidar device may adjust the resource allocations. For example, if a radar device/lidar device scans 20 times per target region and is initially configured to collect 50 samples (50 scan iterations) in different directions, the radar device/lidar device performs a first scan (e.g., an initial scan) using receiver antenna arrays to collect all 50 samples. The 50 samples may be equally spaced from one another. Then, the radar device/lidar device creates a saliency map using the received signals (radar/lidar returns) of the first scan. Based on the saliency map, the radar device/lidar device may perform a subsequent scan by scanning only portions within the target region that previously generated higher intensity of received signals. Hence, instead of scanning every single angle in a region, the radar device/lidar device may reallocate antenna resources to focus on interested regions (e.g., regions with higher intensity/objects). Therefore, in one aspect, after the first scan, the radar device/lidar device may collect less than 50 samples per scan, based on the saliency map. In an aspect, after the first scan, the radar device/lidar device may increase the resolution for the receiver antenna array to focus on the interested regions.

Figure 7:
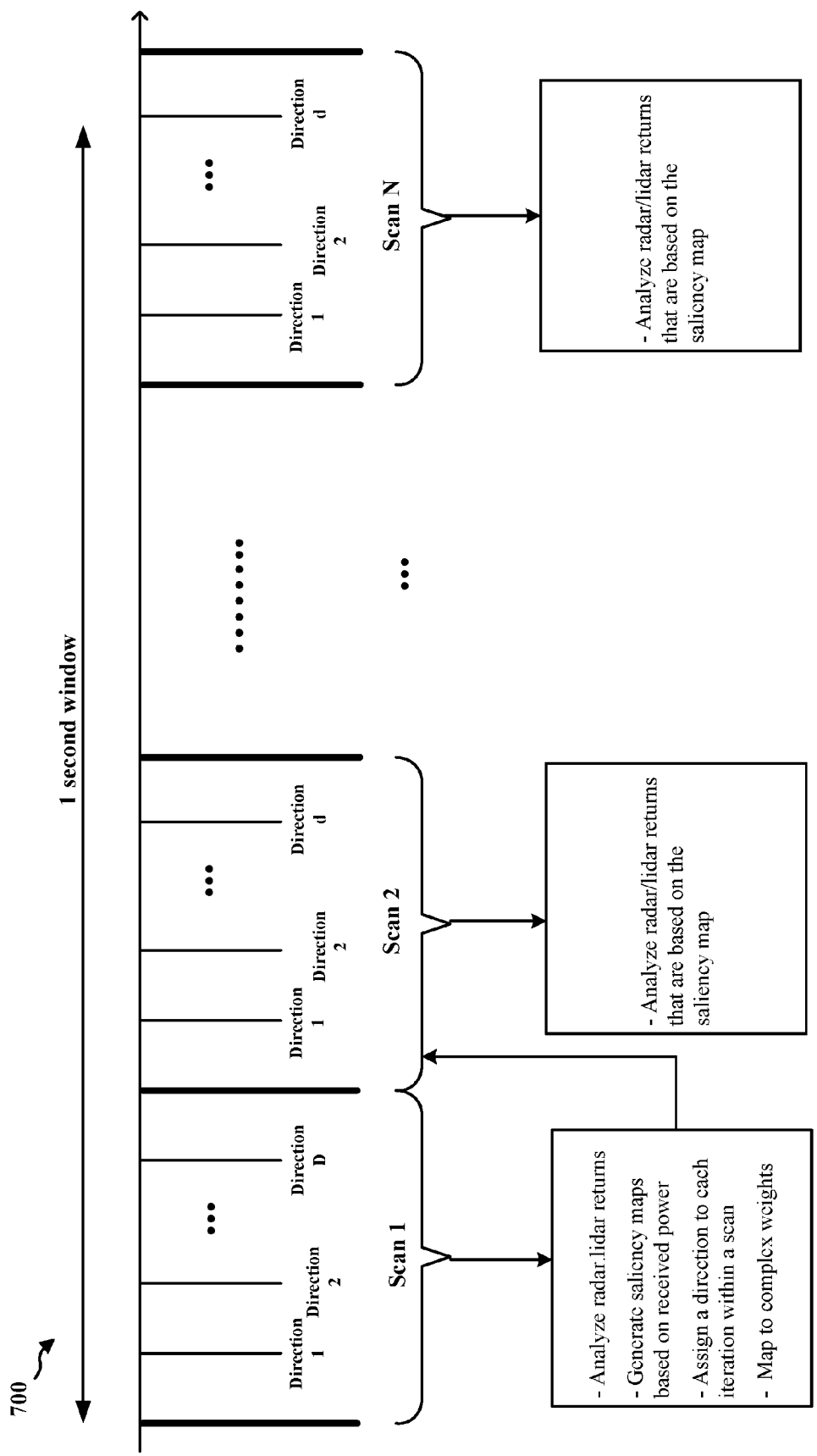
FIG. 7 is an example diagram illustrating radar/lidar scans according to an aspect of the disclosure.

FIG. 7 is an example diagram 700 illustrating radar/lidar scans according to an aspect of the disclosure. In the example diagram 700 of FIG. 7, a radar device/lidar device is initially configured to steer the beam to receive signals in D different directions (D scan iterations). D may be 64. Thus, during the first scan, the radar device/lidar device receives signals (radar/lidar returns) in D different directions using the receiver antenna array. Based on the first scan, the radar device/lidar device analyzes the radar/lidar returns and generates a saliency map based on intensity (e.g., signal strength) of the received signals. For example, the saliency map may represent portion(s) in the target region that have high intensity (e.g., intensity higher than an intensity threshold). The radar device/lidar device may map the saliency map to weights (e.g., complex weights) to apply to respective receiver antenna elements to steer the beam of the receiver antenna array based on the saliency map. In particular, the beam of the receiver antenna array may be steered to directions corresponding to high intensity portions in the saliency map. During the second scan, the radar device/lidar device receives signals (radar/lidar returns) in d different directions, where d is an integer, based on the saliency map. Similarly, for each of the rest of the scans, the radar device/lidar device receives signals (radar/lidar returns) in d different directions based on the saliency map. In one aspect, d may be less than D, and thus the radar device/lidar device may receive signals in less than D different directions, due to the saliency map. In an aspect, the radar device/lidar device may perform a reset scan after several scans using the saliency map, where the reset scan is performed without using the saliency map. For example, because the objects in the target region may change, a reset scan may be performed to generate a new saliency map with salient regions from time to time. In one example, the radar device/lidar device in a vehicle may be in motion, and thus the target region may change as the radar device/lidar device moves, thus changing objects within the target region. In another example, even if the radar device/lidar device is stationary, objects in the target region may move, and thus locations and/or presence of the objects in the target region may change. These examples show that updating the saliency map by performing a reset scan may be beneficial. Thus, the reset scan may be for the purpose of dead reckoning. The radar device/lidar device may generate a new saliency map with salient regions based on the reset scan, and then perform subsequent scans based on the new saliency map and the salient regions.

When the radar device/lidar device performs a subsequent scan based on a saliency map, at least one of two approaches may be implemented for the radar device/lidar device to perform the subsequent scan. According to a first approach, the radar device/lidar device maintains a number of different directions (scan iterations) that fall within the saliency map to receive signals. That is, the radar device/lidar device maintains the resolution for a zone in the region identified by the saliency map. Because the saliency map may indicate a smaller zone of interest than the target region, the radar device/lidar device may take less time to perform a scan of the zone if a number of different directions that fall within the zone is unchanged. Therefore, the first approach may be called a fast scan approach.

Figure 8:
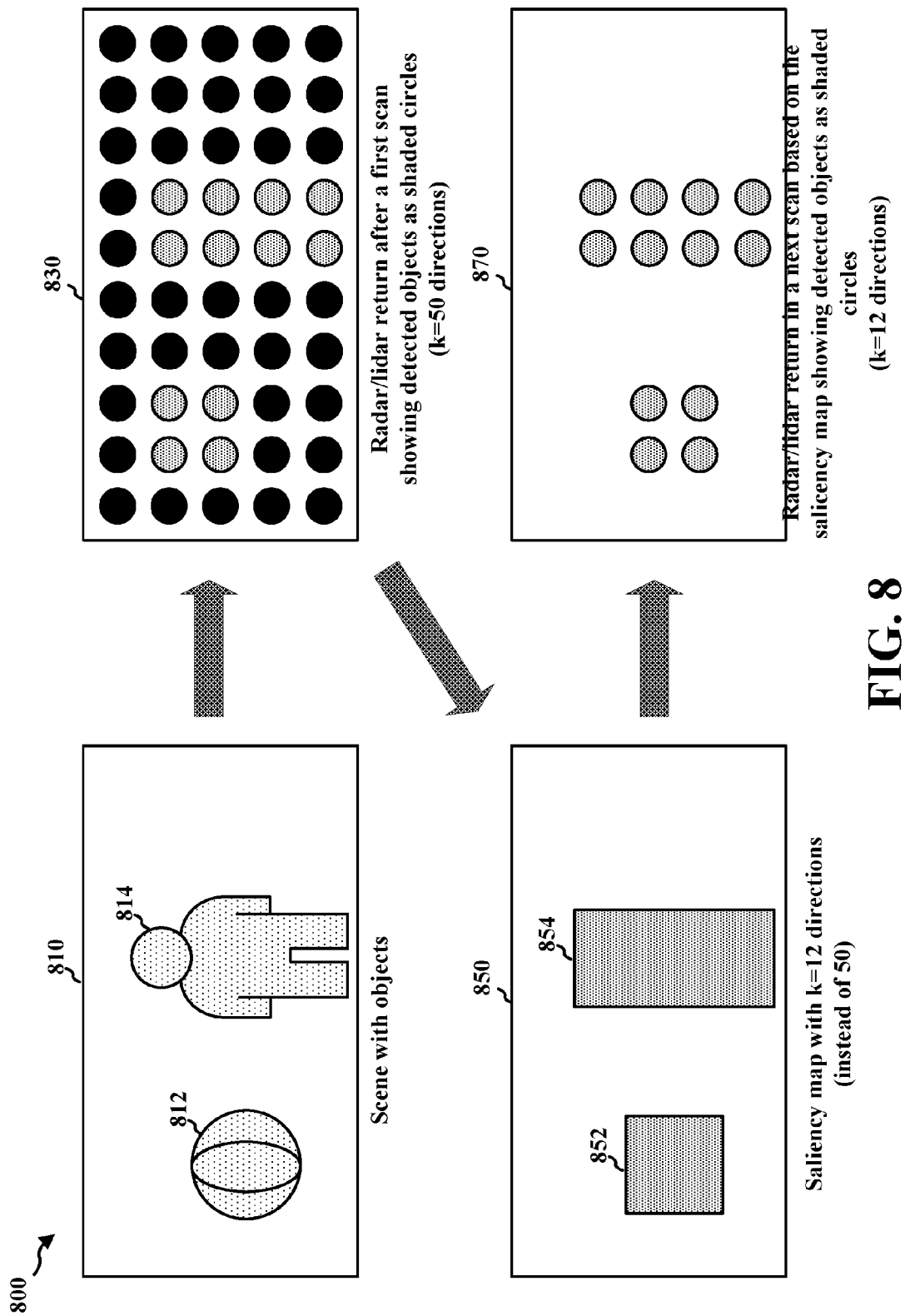
FIG. 8 is an example diagram illustrating a first approach using fast scanning according to an aspect of the disclosure.

FIG. 8 is an example diagram 800 illustrating a first approach using fast scanning according to an aspect of the disclosure. In the example diagram 800 of FIG. 8, a target region 810 is a scene with two objects, a ball 812 and a person 814. In this example, the radar device/lidar device is initially configured to receive signals at 50 (5×10) different directions (50 scan iterations) per scan. Thus, when the radar device/lidar device performs a first scan of the target region 810, the radar/lidar return 830 includes signal intensities at 50 different directions within the target region 810. As a result of the first scan, the radar device/lidar device obtains the radar/lidar return 830 showing detected objects as shaded circles and the surrounding regions as black circles, where the shaded circles represent directions where the received signals have high intensity (e.g., greater than an intensity threshold) indicating reflection from an object, and the black circles represent directions where the received signals have low intensity (e.g., less than the intensity threshold). After the first scan, the radar device/lidar device generates a saliency map. The saliency map has a first salient region 852 and a second salient region 854. The first salient region 852 is generated based on the 4 shaded circles corresponding to the signals reflected from the ball 812, and the second salient region 854 is generated based on the 8 shaded circles corresponding to the signals reflected from the person 814. Thus, the saliency map 850 may identify 12 different directions, including 4 directions of the 4 shaded circles corresponding to the ball 812 and 8 directions of the 8 shaded circles corresponding to the person 814 of interest.

After the saliency map 850 is generated, the radar device/lidar device is configured to receive signals at directions corresponding to the saliency map 850. Thus, in this example, the radar device/lidar device is configured to receive signals at 4 different directions in the first salient region 852 and at 8 different directions in the second salient region 854. Therefore, in a next scan 870, the radar device/lidar device obtains signal intensities for signals received at 12 different directions (scan iterations), which include 4 different directions in the first salient region 852 and at 8 different directions in the second salient region 854. As illustrated, a number of scan iterations per area within the saliency map 850 in the next scan 870 is the same as a number of scan iterations per area in the first scan 830. Because the radar device/lidar device receives signals in less directions (fewer scan iterations) during the next scan than during the first scan, the radar device/lidar device takes less time to perform the next scan than to perform the first scan. After several scans based on the saliency map 850, the radar device/lidar device may perform a reset scan ("dead-reckon") without using the saliency map 850. The radar device/lidar device may generate a new saliency map based on the reset scan, and then perform subsequent scans based on the new saliency map. The radar device/lidar device may perform the reset scan every w scans, where w is an integer.

According to a second approach, the radar device/lidar device may increase a number of different directions (scan iterations) that fall within a saliency map to receive signals. That is, the radar device/lidar device may increase the resolution of a region within the saliency map. In an aspect, when increasing the resolution of a region, an angular resolution of the receiver antenna array may be considered. An angular resolution is minimum angular separation at which two equal targets can be separated when at the same range. The number of different directions (scan iterations) may be increased to a number where the angular resolution is high enough to distinguish two adjacent directions. The radar device/lidar device may increase an angular resolution by increasing a number of receiver antenna elements used to receive a signal. In particular, increasing a number of receiver antenna elements may decrease the beam width of the receive antenna array, which results higher angular resolution. With the narrower beam width, the radar device/lidar device may be able to increase a number of different directions (scan iterations) more effectively. In an aspect, a higher radar/lidar scan frequency may provide higher angular resolution. Thus, the angular resolution of the receiver antenna array may be affected by the number of receiver antenna array elements and the radar/lidar scan frequency. Because the radar device/lidar device scans the region corresponding to the saliency map with the increased resolution, processing time and processing power may be reduced as compared to scanning the entire target region with the increased resolution. The second approach may be called a high resolution scan approach.

Figure 9:
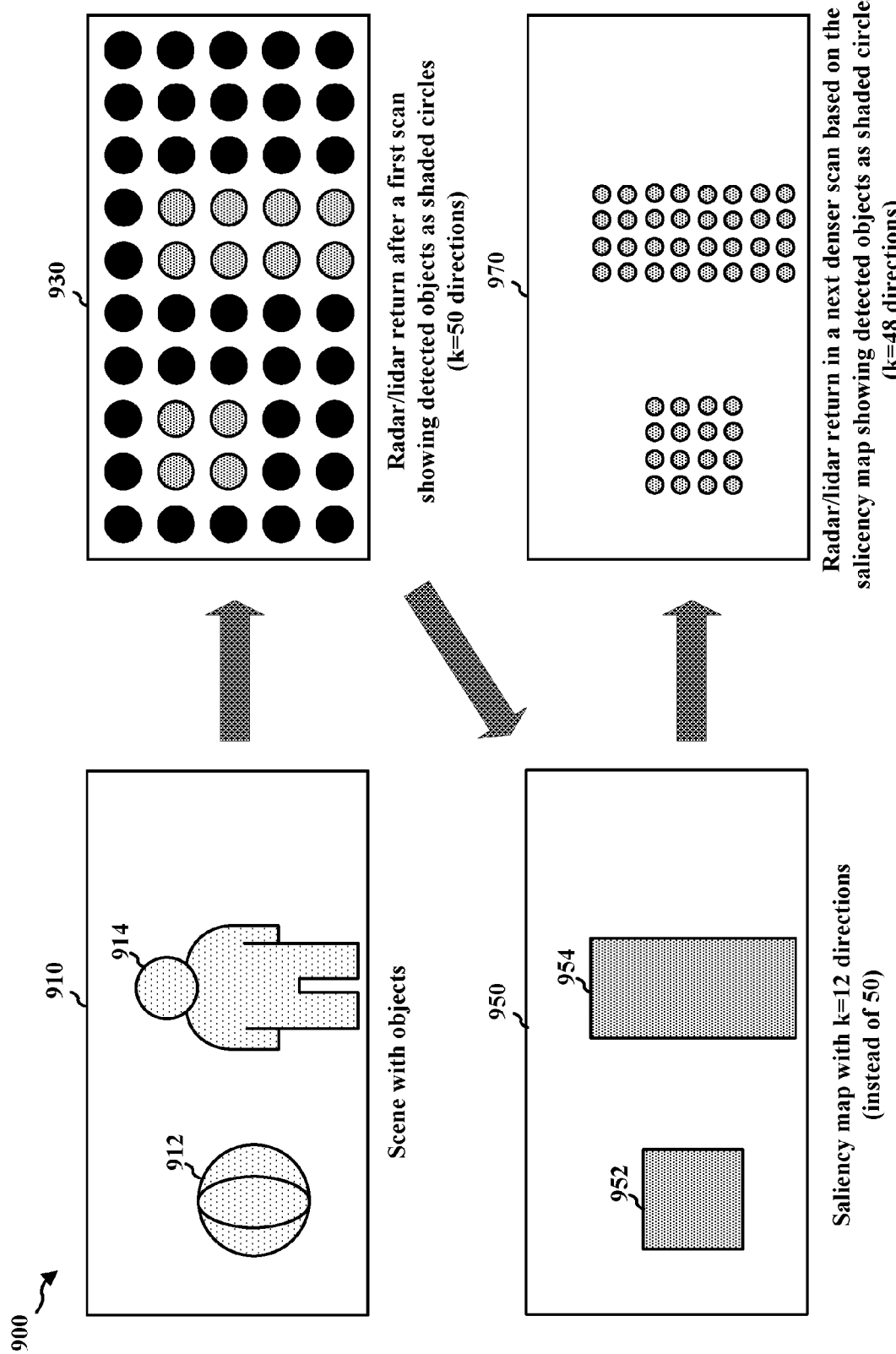
FIG. 9 is an example diagram illustrating a second approach using high resolution scanning according to an aspect of the disclosure.

FIG. 9 is an example diagram 900 illustrating a second approach using high resolution scanning according to an aspect of the disclosure. In the example diagram 900 of FIG. 9, a target region 910 is a scene with two objects, a ball 912 and a person 914. The radar device/lidar device is initially configured to receive signals at 50 (5×10) different directions (50 scan iterations) per scan. The 50 directions may be equally spaced. Thus, when the radar device/lidar device performs a first scan of the target region 910, the radar/lidar return 930 includes signal intensities at 50 different directions within the target region 910. As a result of the first scan, the radar device/lidar device obtains the radar/lidar return 930 showing detected objects as shaded circles and the surrounding regions as black circles, where the shaded circles represent directions where the received signals have high intensity (e.g., greater than an intensity threshold) indicating reflection from an object, and the black circles represent directions where the received signals have low intensity (e.g., less than the intensity threshold). After the first scan, the radar device/lidar device generates a saliency map including a first salient region 952 and a second salient region 954. The first salient region 952 is generated based on the 4 shaded circles corresponding to the signals reflected from the ball 912, and the second salient region 954 is generated based on the 8 shaded circles corresponding to the signals reflected from the person 914. Thus, the saliency map 950 is based on 12 different directions, including 4 directions of the 4 shaded circles corresponding to the ball 912 and 8 directions of the 8 shaded circles corresponding to the person 914.

After the saliency map 950 is generated, the radar device/lidar device may be configured to receive signals at directions corresponding to the saliency map 950, where a number of directions corresponding to the saliency map 950 for the next scan is increased to concentrate the directions (scan iterations) in the saliency regions. For example, the radar device/lidar device may be configured to receive signals at 16 different directions (instead of 4 directions) in the first salient region 952 and at 32 different directions (instead of 8 different directions) in the second salient region 954. Therefore, in the next scan, the radar device/lidar device obtains the radar/lidar return 970 showing signal intensities at 48 different directions, which include 16 different directions in the first salient region 952 and at 32 different directions in the second salient region 954. In an aspect, the 16 different directions in the first salient region may be equally spaced from one another, and the 48 different directions in the second salient region may be equally spaced from one another. As illustrated, a number of scan iterations per area within the saliency map 950 in the next scan 970 is higher than a number of scan iterations per area in the first scan 930. Because the radar device/lidar device receives signals in more directions per salient region during the next scan than during the first scan, the radar device/lidar device receives a higher resolution of signal data per salient region in the next scan than the first scan. After several scans based on the saliency map 950, the radar device/lidar device may perform a reset scan ("dead-reckon") without using the saliency map 950. The radar device/lidar device may generate a new saliency map based on the reset scan, and then perform subsequent scans based on the new saliency map. The radar device/lidar device may perform the reset scan every w scans, where w is an integer.

Figure 10:
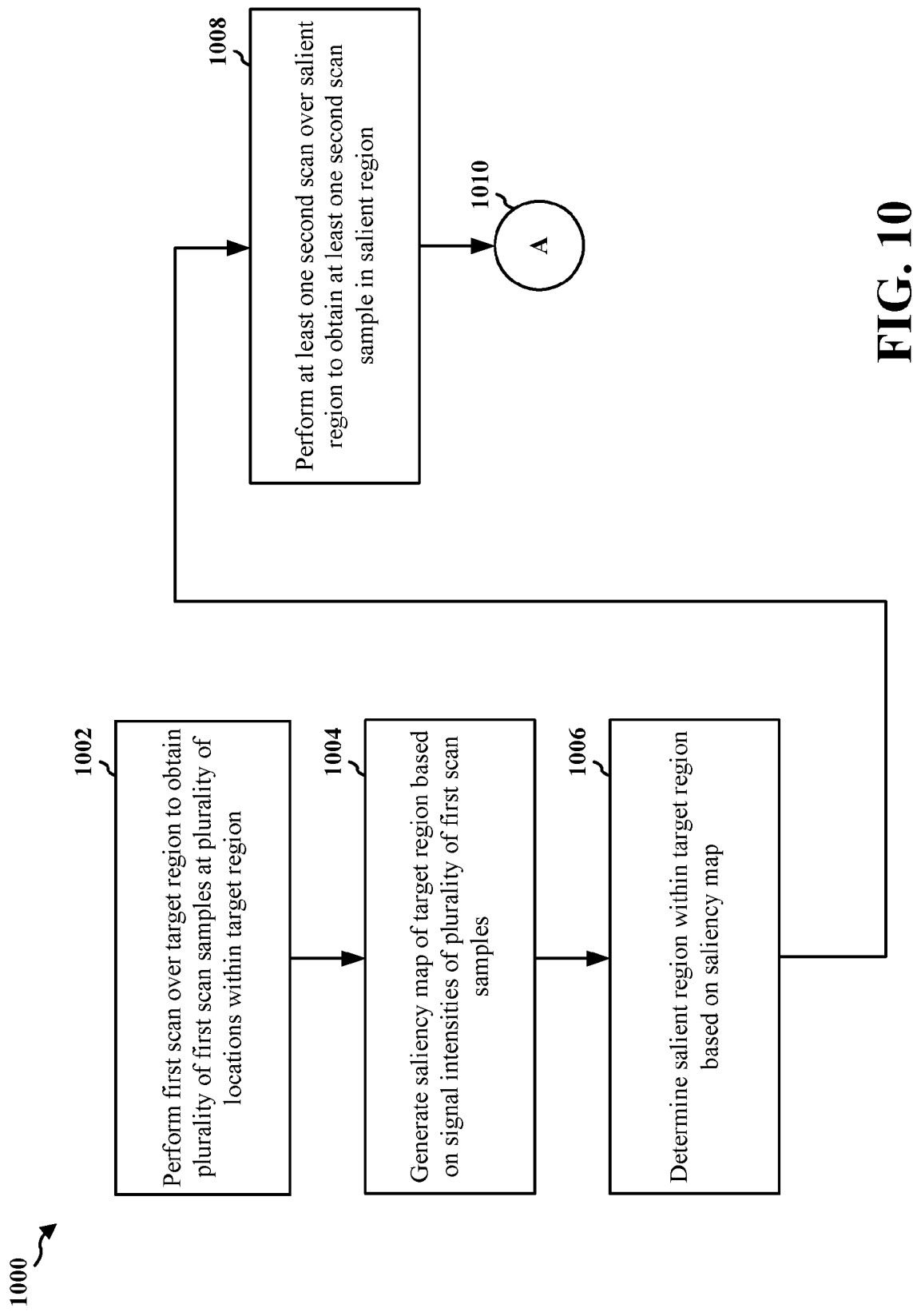
FIG. 10 is a flowchart of a method of scanning by a scanning device, according to an aspect of the disclosure.

FIG. 10 is a flowchart 1000 of a method of scanning by a scanning device, according to an aspect of the disclosure. The method may be performed by a scanning device for scanning (e.g., the scanning device 112, the scanning device 650, the apparatus 1202/1202'). The scanning device may be for radio-based scanning and/or laser-based scanning. In an aspect, the radio-based scanning may include radar scanning and the laser-based scanning may include lidar scanning. At 1002, the scanning device performs a first scan over a target region to obtain a plurality of first scan samples at a plurality of locations within the target region. For example, as discussed supra, as a result of the first scan, the radar device/lidar device obtains the radar/lidar return 830 showing detected objects as shaded circles and the surrounding regions as black circles, where the shaded circles represent directions where the received signals have high intensity (e.g., greater than an intensity threshold) indicating reflection from an object, and the black circles represent directions where the received signals have low intensity (e.g., less than the intensity threshold).

At 1004, the scanning device generates a saliency map of the target region based on signal intensities of the plurality of first scan samples. At 1006, the scanning device determines a salient region within the target region based on the saliency map. In an aspect, the salient region is determined based on at least one high intensity area within the target region, and the at least one high intensity area corresponds to a location of at least one of the first scan samples with signal intensity greater than an intensity threshold. For example, as discussed supra, after the first scan, the radar device/lidar device generates a saliency map, where the saliency map has a first salient region 852 and a second salient region 854. For example, as discussed supra, the first salient region 852 is generated based on the 4 shaded circles corresponding to the signals reflected from the ball 812, and the second salient region 854 is generated based on the 8 shaded circles corresponding to the signals reflected from the person 814.

At 1008, the scanning device performs at least one second scan over the salient region to obtain at least one second scan sample in the salient region. In an aspect, the scanning device may perform the at least one scan by performing at least one of a high speed scan over the salient region or a high resolution scan over the salient region. In an aspect, the high speed scan over the salient region may be performed with a same number of scan samples per area as a number of scan samples per area for the first scan over the target region. For example, as discussed supra, according to a first approach, the radar device/lidar device maintains a number of different directions (scan iterations) that fall within the saliency map to receive signals. For example, as discussed supra, the radar device/lidar device maintains the resolution for a zone in the region identified by the saliency map. For example, as discussed supra, after the saliency map 850 is generated, the radar device/lidar device is configured to receive signals at directions corresponding to the saliency map 850. For example, as discussed supra, a number of scan iterations per area within the saliency map 850 in the next scan 870 is the same as a number of scan iterations per area in the first scan 830. In an aspect, the high resolution scan over the salient region may be performed with a higher number of scan samples per area than a number of scan samples per area for the first scan over the target region. For example, as discussed supra, the radar device/lidar device may increase a number of different directions (scan iterations) that fall within a saliency map to receive signals. For example, as discussed supra, after the saliency map 950 is generated, the radar device/lidar device may be configured to receive signals at directions corresponding to the saliency map 950, where a number of directions corresponding to the saliency map 950 for the next scan is increased to concentrate the directions (scan iterations) in the saliency regions. For example, as discussed supra, a number of scan iterations per area within the saliency map 950 in the next scan 970 is higher than a number of scan iterations per area in the first scan 930. At 1010, the scanning device may perform additional features, as described infra.

In an aspect, a number of scan samples per area for the first scan and a number of scan samples per area for the at least one second scan are based on at least one of a number of receiver elements of the scanning device or a scan frequency. For example, as discussed supra, the number of different directions (scan iterations) may be increased to a number where the angular resolution is high enough to distinguish two adjacent directions. For example, as discussed supra, the angular resolution of the receiver antenna array may be affected by the number of receiver antenna array elements and the radar/lidar scan frequency.

Figure 11:
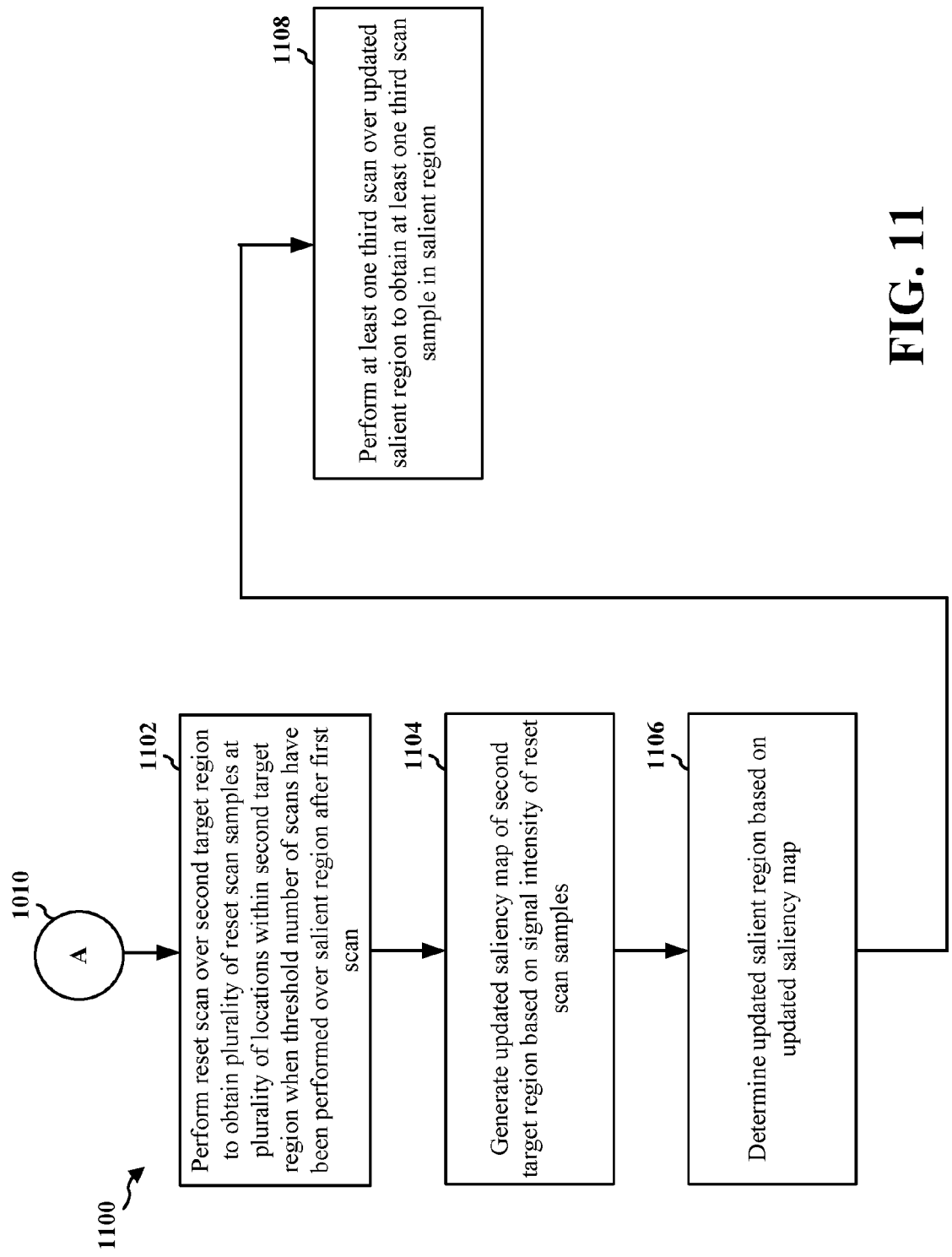
FIG. 11 is a flowchart of a method of scanning by a scanning device, expanding from the flowchart of FIG. 10.

In an aspect, the first scan is performed using beamforming to digitally steer a direction of the first scan over the target region, and the at least one second scan is performed using beamforming to digitally steer a direction of the at least one second scan over the salient region. In such an aspect, the beamforming is performed by adjusting phase values for a plurality of receivers of the scanning device. For example, as discussed supra, the DSP aggregates the output from each antenna element in a way that simulates a large single antenna, by effectively "steering" the receiver antenna array, using a beamforming approach. For example, as discussed supra, phase delays may be applied to the receiver antenna elements, such that when the phase-delayed signals from the receiver antenna elements are added together, the effect of digital steering of the receiver antenna array is achieved FIG. 11 is a flowchart 1100 of a method of scanning by a scanning device, expanding from the flowchart 1000 of FIG. 10. The method may be performed by a scanning device for scanning (e.g., the scanning device 112, the scanning device 650, the apparatus 1202/1202'). At 1010, the scanning device continues from the flowchart 1000 of FIG. 10. At 1102, the scanning device performs a reset scan over a second target region to obtain a plurality of reset scan samples at a plurality of locations within the second target region when a threshold number of scans have been performed over the salient region after the first scan. For example, as discussed supra, the radar device/lidar device may perform a reset scan after several scans using the saliency map, where the reset scan is performed without using the saliency map. At 1104, the scanning device generates an updated saliency map of the second target region based on signal intensities of the plurality of reset scan samples. At 1106, the scanning device determines an updated salient region based on the updated saliency map. For example, as discussed supra, a reset scan may be performed to generate a new saliency map with salient regions from time to time. At 1108, the scanning device performs at least one third scan over the updated salient region to obtain at least one third scan sample in the salient region. For example, as discussed supra, the radar device/lidar device may generate a new saliency map with salient regions based on the reset scan, and then perform subsequent scans based on the new saliency map and the salient regions.

Figure 12:
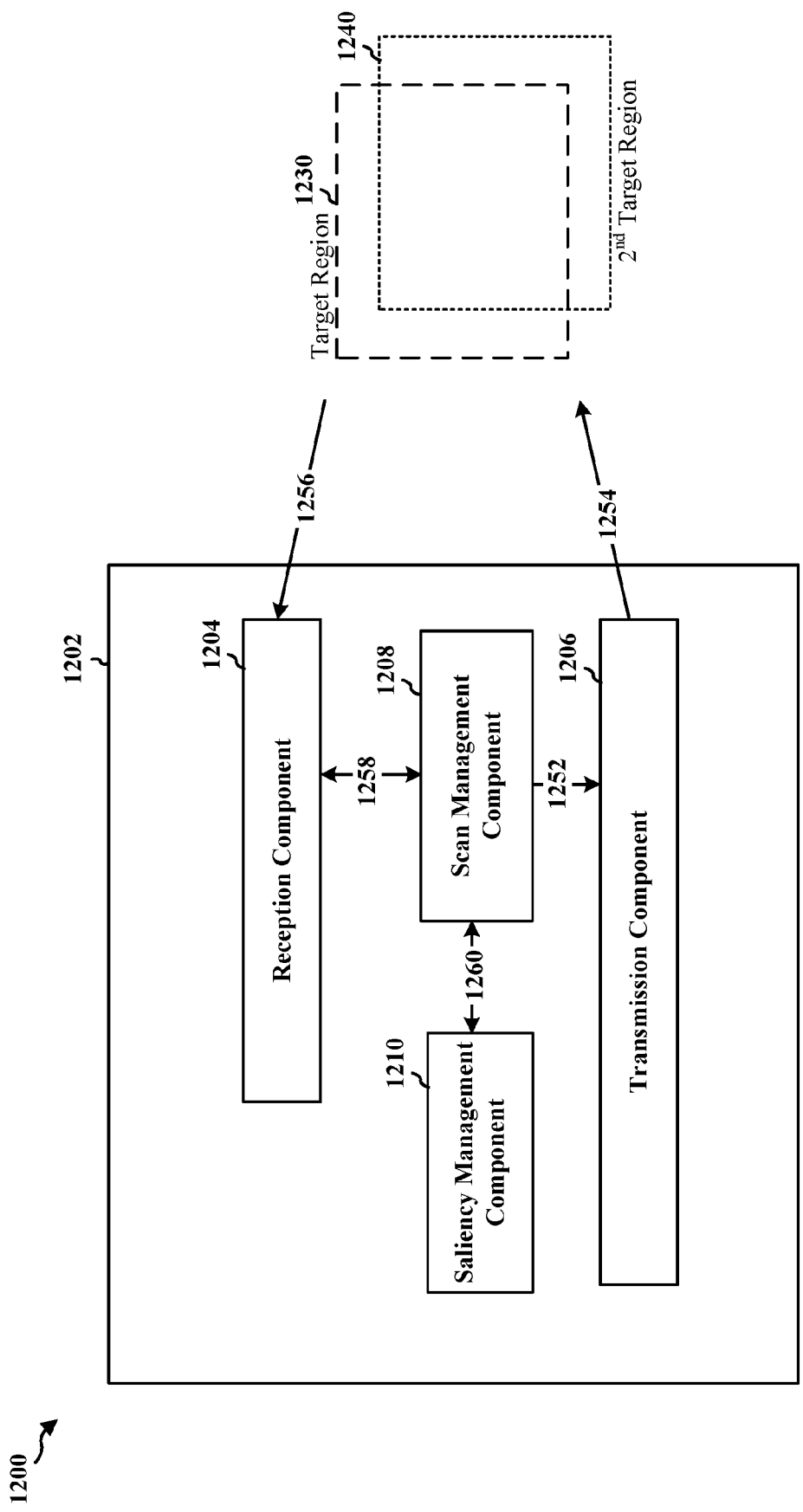
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a scanning device for radio-based scanning and/or laser-based scanning. In an aspect, the radio-based scanning may include radar scanning and the laser-based scanning may include lidar scanning. The apparatus includes a reception component 1204, a transmission component 1206, a scan management component 1208, and a saliency management component 1210.

The scan management component 1208 performs a first scan (e.g., via the reception component 1204 and the transmission component 1206) over a target region 1230 to obtain a plurality of first scan samples at a plurality of locations within the target region 1230, at 1252, 1254, 1256, and 1258. The scan management component 1208 may determine intensity of the plurality of first scan samples, and may forward the intensity of the plurality of first scan samples to the saliency management component 1210, at 1260. The saliency management component 1210 generates a saliency map of the target region based on signal intensities of the plurality of first scan samples. The saliency management component 1210 determines a salient region within the target region 1230 based on the saliency map. The saliency management component 1210 may forward information about the salient region and the saliency map to the scan management component 1208, at 1260. The scan management component 1208 performs at least one second scan (e.g., via the reception component 1204 and the transmission component 1206) over the salient region to obtain at least one second scan sample in the salient region within the target region 1230, at 1252, 1254, 1256, and 1258. In an aspect, the scan management component 1208 may perform the at least one scan by performing at least one of a high speed scan over the salient region or a high resolution scan over the salient region. In an aspect, the high speed scan over the salient region may be performed with a same number of scan samples per area as a number of scan samples per area for the first scan over the target region 1230. In an aspect, the high resolution scan over the salient region may be performed with a higher number of scan samples per area than a number of scan samples per area for the first scan over the target region 1230.

In an aspect, a number of scan samples per area for the first scan and a number of scan samples per area for the at least one second scan are based on at least one of a number of receiver elements of the scanning device or a scan frequency.

In an aspect, the salient region is determined based on at least one high intensity area within the target region 1230, and the at least one high intensity area corresponds to a location of at least one of the first scan samples with signal intensity greater than an intensity threshold.

In an aspect, the first scan is performed using beamforming to digitally steer a direction of the first scan over the target region 1230, and the at least one second scan is performed using beamforming to digitally steer a direction of the at least one second scan over the salient region. In such an aspect, the beamforming is performed by adjusting phase values for a plurality of receivers of the scanning device.

In an aspect, the scan management component 1208 performs a reset scan (e.g., via the reception component 1204 and the transmission component 1206) over a second target region 1240 to obtain a plurality of reset scan samples at a plurality of locations within the second target region 1240 when a threshold number of scans have been performed over the salient region after the first scan, at 1252, 1254, 1256, and 1258. The scan management component 1208 may determine intensity of the plurality of reset scan samples, and may forward the intensity of the plurality of reset scan samples to the saliency management component 1210, at 1260. The saliency management component 1210 generates an updated saliency map of the second target region 1240 based on signal intensities of the plurality of reset scan samples. The saliency management component 1210 determines an updated salient region based on the updated saliency map. The saliency management component 1210 may forward information about the updated salient region and the updated saliency map to the scan management component 1208. The scan management component 1208 performs at least one third scan (e.g., via the reception component 1204 and the transmission component 1206) over the updated salient region to obtain at least one third scan sample in the salient region within the second target region 1240, at 1252, 1254, 1256, and 1258.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
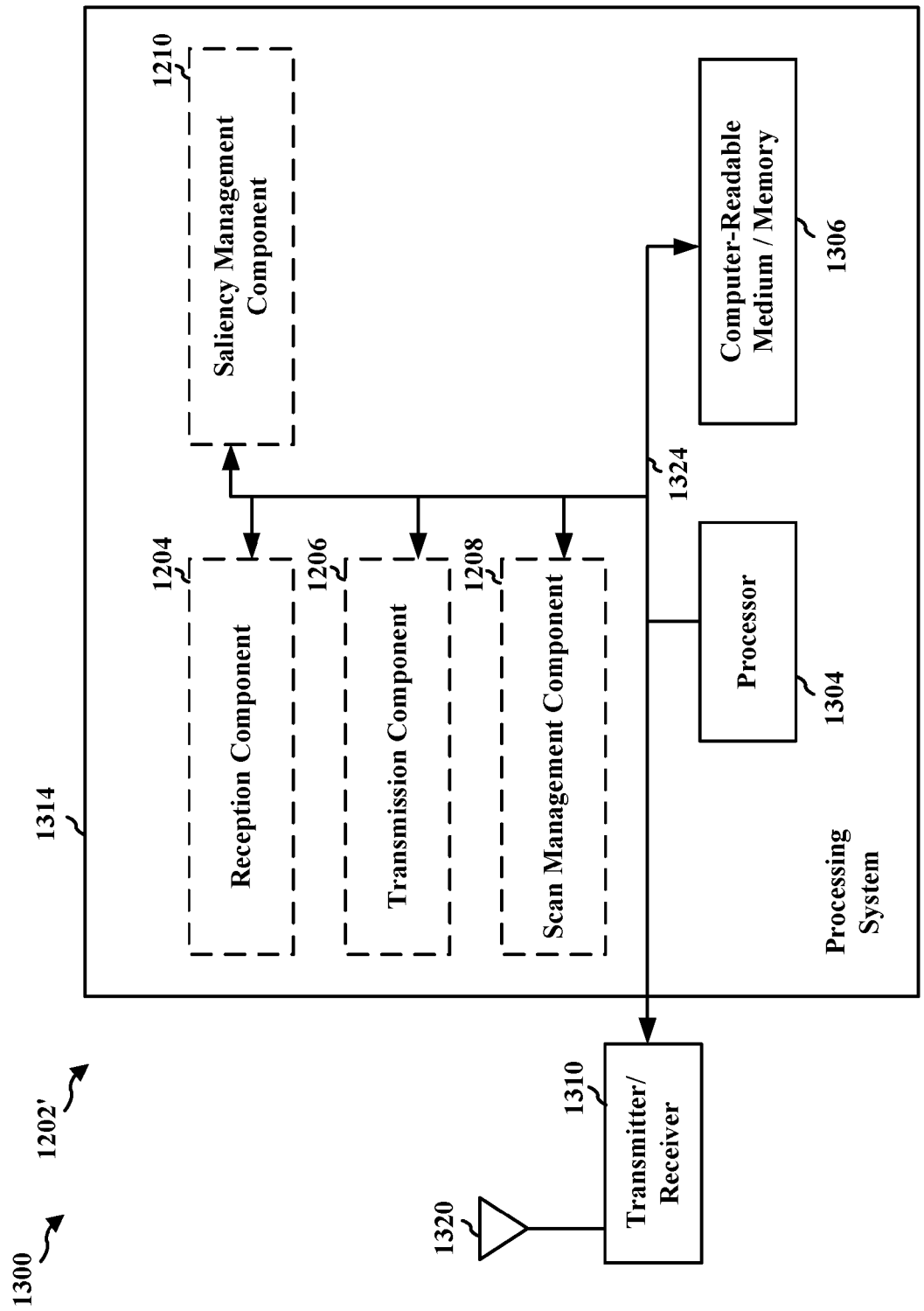
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transmitter/receiver 1310. The transmitter/receiver 1310 is coupled to one or more antennas 1320. The transmitter/ receiver 1310 provides a means for transmitting and receiving signals such as wave signals. The transmitter/receiver 1310 receives a signal from the one or more antennas 1320, extracts information from the received signal, and provides the extracted information to the processing system 1314, specifically the reception component 1204. In addition, the transmitter/receiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210. The components may be software components running in the processor 1304, resident/stored in the computer readable medium/memory 1306, one or more hardware components coupled to the processor 1304, or some combination thereof.

In one configuration, the apparatus 1202/1202' for scanning includes means for performing a first scan over a target region to obtain a plurality of first scan samples at a plurality of locations within the target region, means for generating a saliency map of the target region based on signal intensities of the plurality of first scan samples, means for determining a salient region within the target region based on the saliency map, and means for performing at least one second scan over the salient region to obtain at least one second scan sample in the salient region. In an aspect, the means for performing the at least one second scan is configured to perform at least one of a high speed scan over the salient region or a high resolution scan over the salient region. In an aspect, the apparatus 1202/1202' includes means for performing a reset scan over a second target region to obtain a plurality of reset scan samples at a plurality of locations within the second target region when a threshold number of scans have been performed over the salient region after the first scan, means for generating an updated saliency map of the second target region based on signal intensities of the plurality of reset scan samples, determining an updated salient region based on the updated saliency map, and means for performing at least one third scan over the updated salient region to obtain at least one third scan sample in the salient region. The aforementioned means may be one or more of the aforementioned components of the apparatus 1202 and/or the processing system 1314 of the apparatus 1202' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of scanning by a scanning device, comprising:
   performing a first scan over a target region to obtain a plurality of first scan samples at a plurality of locations within the target region;
   generating a saliency map of the target region based on signal intensities of the plurality of first scan samples;
   determining a salient region within the target region based on the saliency map; and
   performing at least one second scan over the salient region to obtain at least one second scan sample in the salient region, wherein the at least one second scan is performed using beamforming to digitally steer a direction of the at least one second scan over the salient region.

2. The method of claim 1, wherein the performing the at least one second scan comprises:
   performing at least one of a high speed scan over the salient region or a high resolution scan over the salient region.

3. The method of claim 2, wherein the high speed scan over the salient region is performed with a same number of scan samples per area as a number of scan samples per area for the first scan over the target region.

4. The method of claim 2, wherein the high resolution scan over the salient region is performed with a higher number of scan samples per area than a number of scan samples per area for the first scan over the target region.

5. The method of claim 1, wherein a number of scan samples per area for the first scan and a number of scan samples per area for the at least one second scan are based on at least one of a number of receiver elements of the scanning device or a scan frequency.

6. The method of claim 1, wherein the salient region is determined based on at least one high intensity area within the target region, and
wherein the at least one high intensity area corresponds to a location of at least one of the first scan samples with a signal intensity greater than an intensity threshold.

7. The method of claim 1, further comprising:
performing a reset scan over a second target region to obtain a plurality of reset scan samples at a plurality of locations within the second target region when a threshold number of scans have been performed over the salient region after the first scan;
generating an updated saliency map of the second target region based on signal intensities of the plurality of reset scan samples;
determining an updated salient region based on the updated saliency map; and
performing at least one third scan over the updated salient region to obtain at least one third scan sample in the salient region.

8. The method of claim 1, wherein the scanning device is for at least one of radio-based scanning or laser-based scanning, and
wherein the radio-based scanning includes radar scanning and the laser-based scanning includes lidar scanning.

9. The method of claim 1, wherein the first scan is performed using beamforming to digitally steer a direction of the first scan over the target region.

10. The method of claim 9, wherein the beamforming is performed by adjusting phase values for a plurality of receivers of the scanning device.

11. A scanning device for scanning, comprising:
means for performing a first scan over a target region to obtain a plurality of first scan samples at a plurality of locations within the target region;
means for generating a saliency map of the target region based on signal intensities of the plurality of first scan samples;
means for determining a salient region within the target region based on the saliency map; and
means for performing at least one second scan over the salient region to obtain at least one second scan sample in the salient region, wherein the at least one second scan is performed using beamforming to digitally steer a direction of the at least one second scan over the salient region.

12. The scanning device of claim 11, wherein the means for performing the at least one second scan is configured to:
perform at least one of a high speed scan over the salient region or a high resolution scan over the salient region.

13. The scanning device of claim 12, wherein the high speed scan over the salient region is performed with a same number of scan samples per area as a number of scan samples per area for the first scan over the target region.

14. The scanning device of claim 12, wherein the high resolution scan over the salient region is performed with a higher number of scan samples per area than a number of scan samples per area for the first scan over the target region.

15. The scanning device of claim 11, wherein a number of scan samples per area for the first scan and a number of scan samples per area for the at least one second scan are based on at least one of a number of receiver elements of the scanning device or a scan frequency.

16. The scanning device of claim 11, wherein the salient region is determined based on at least one high intensity area within the target region, and
wherein the at least one high intensity area corresponds to a location of at least one of the first scan samples with a signal intensity greater than an intensity threshold.

17. The scanning device of claim 11, further comprising:
means for performing a reset scan over a second target region to obtain a plurality of reset scan samples at a plurality of locations within the second target region when a threshold number of scans have been performed over the salient region after the first scan;
means for generating an updated saliency map of the second target region based on signal intensities of the plurality of reset scan samples;
means for determining an updated salient region based on the updated saliency map; and
means for performing at least one third scan over the updated salient region to obtain at least one third scan sample in the salient region.

18. The scanning device of claim 11, wherein the scanning device is for at least one of radio-based scanning or laser-based scanning, and
wherein the radio-based scanning includes radar scanning and the laser-based scanning includes lidar scanning.

19. The scanning device of claim 11, wherein the first scan is performed using beamforming to digitally steer a direction of the first scan over the target region.

20. The scanning device of claim 19, wherein the beamforming is performed by adjusting phase values for a plurality of receivers of the scanning device.

21. A scanning device for scanning, comprising:
a memory; and
at least one processor coupled to the memory and configured to:
perform a first scan over a target region to obtain a plurality of first scan samples at a plurality of locations within the target region;
generate a saliency map of the target region based on signal intensities of the plurality of first scan samples;
determine a salient region within the target region based on the saliency map; and
perform at least one second scan over the salient region to obtain at least one second scan sample in the salient region, wherein the at least one second scan is performed using beamforming to digitally steer a direction of the at least one second scan over the salient region.

22. The scanning device of claim 21, wherein the at least one processor configured to perform the at least one second scan is configured to:
perform at least one of a high speed scan over the salient region or a high resolution scan over the salient region.

23. The scanning device of claim 22, wherein the high speed scan over the salient region is performed with a same number of scan samples per area as a number of scan samples per area for the first scan over the target region.

24. The scanning device of claim 22, wherein the high resolution scan over the salient region is performed with a higher number of scan samples per area than a number of scan samples per area for the first scan over the target region.

25. The scanning device of claim 21, wherein a number of scan samples per area for the first scan and a number of scan samples per area for the at least one second scan are based on at least one of a number of receiver elements of the scanning device or a scan frequency.

26. The scanning device of claim 21, wherein the salient region is determined based on at least one high intensity area within the target region, and
wherein the at least one high intensity area corresponds to a location of at least one of the first scan samples with a signal intensity greater than an intensity threshold.

27. The scanning device of claim 21, wherein the at least one processor is further configured to:
perform a reset scan over a second target region to obtain a plurality of reset scan samples at a plurality of locations within the second target region when a threshold number of scans have been performed over the salient region after the first scan;
generate an updated saliency map of the second target region based on signal intensities of the plurality of reset scan samples;
determine an updated salient region based on the updated saliency map; and
perform at least one third scan over the updated salient region to obtain at least one third scan sample in the salient region.

28. The scanning device of claim 21, wherein the scanning device is for at least one of radio-based scanning or laser-based scanning, and
wherein the radio-based scanning includes radar scanning and the laser-based scanning includes lidar scanning.

29. The scanning device of claim 21, wherein the first scan is performed using beamforming to digitally steer a direction of the first scan over the target region.

30. The scanning device of claim 29, wherein the beamforming is performed by adjusting phase values for a plurality of receivers of the scanning device.

31. A non-transitory computer-readable medium storing computer executable code for a scanning device for scanning, comprising code to:
perform a first scan over a target region to obtain a plurality of first scan samples at a plurality of locations within the target region;
generate a saliency map of the target region based on signal intensities of the plurality of first scan samples;
determine a salient region within the target region based on the saliency map; and
perform at least one second scan over the salient region to obtain at least one second scan sample in the salient region, wherein the at least one second scan is performed using beamforming to digitally steer a direction of the at least one second scan over the salient region.

32. The non-transitory computer-readable medium of claim 31, wherein the code to perform the at least one second scan comprises code to:
perform at least one of a high speed scan over the salient region or a high resolution scan over the salient region.

33. The non-transitory computer-readable medium of claim 32, wherein the high speed scan over the salient region is performed with a same number of scan samples per area as a number of scan samples per area for the first scan over the target region.

34. The non-transitory computer-readable medium of claim 32, wherein the high resolution scan over the salient region is performed with a higher number of scan samples per area than a number of scan samples per area for the first scan over the target region.

35. The non-transitory computer-readable medium of claim 31, wherein a number of scan samples per area for the first scan and a number of scan samples per area for the at least one second scan are based on at least one of a number of receiver elements of the scanning device or a scan frequency.

36. The non-transitory computer-readable medium of claim 31, wherein the salient region is determined based on at least one high intensity area within the target region, and
wherein the at least one high intensity area corresponds to a location of at least one of the first scan samples with a signal intensity greater than an intensity threshold.

37. The non-transitory computer-readable medium of claim 31, further comprises code to:
perform a reset scan over a second target region to obtain a plurality of reset scan samples at a plurality of locations within the second target region when a threshold number of scans have been performed over the salient region after the first scan;
generate an updated saliency map of the second target region based on signal intensities of the plurality of reset scan samples;
determine an updated salient region based on the updated saliency map; and
perform at least one third scan over the updated salient region to obtain at least one third scan sample in the salient region.

38. The non-transitory computer-readable medium of claim 31, wherein the scanning device is for at least one of radio-based scanning or laser-based scanning, and
wherein the radio-based scanning includes radar scanning and the laser-based scanning includes lidar scanning.

39. The non-transitory computer-readable medium of claim 31, wherein the first scan is performed using beamforming to digitally steer a direction of the first scan over the target region.

40. The non-transitory computer-readable medium of claim 39, wherein the beamforming is performed by adjusting phase values for a plurality of receivers of the scanning device.

* * * * *